United States Patent
Restaino et al.

(10) Patent No.: US 6,420,049 B1
(45) Date of Patent: *Jul. 16, 2002

(54) SHIELD FOR WATER AND SOUND

(75) Inventors: Michael C. Restaino, Birmingham; Richard H. Puckett, St. Clair, both of MI (US)

(73) Assignee: Cadillac Products, Inc., Troy, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/542,601

(22) Filed: Apr. 4, 2000

Related U.S. Application Data

(63) Continuation of application No. 08/803,985, filed on Feb. 21, 1997, now Pat. No. 6,045,921, which is a continuation-in-part of application No. 08/391,407, filed on Feb. 16, 1995, which is a division of application No. 08/160,375, filed on Nov. 30, 1993, now Pat. No. 5,409,779, which is a continuation of application No. 07/652,021, filed on Feb. 7, 1991, now abandoned.

(51) Int. Cl.⁷ ............................................... B32B 27/00
(52) U.S. Cl. ...................... 428/500; 428/174; 428/515; 428/516; 428/519; 428/521
(58) Field of Search .................. 428/174, 500, 428/514, 515, 519, 521, 332; 524/426, 427, 423; 525/240, 232

(56) References Cited

U.S. PATENT DOCUMENTS

| | | |
|---|---|---|
| 3,213,071 A | 10/1965 | Campbell |
| 3,526,000 A | 8/1970 | Williams |
| 4,046,945 A | 9/1977 | Baxmann et al. |
| 4,483,958 A | 11/1984 | Kosaka et al. |
| 4,588,627 A | 5/1986 | Isaksen et al. |
| 4,613,643 A | 9/1986 | Nakamura et al. |
| 4,623,587 A | 11/1986 | Ito et al. |
| 4,696,848 A | 9/1987 | Jones et al. |
| 4,728,692 A | 3/1988 | Sezaki et al. |
| 4,734,450 A | 3/1988 | Kawai et al. |
| 4,801,651 A | 1/1989 | Komatsu et al. |
| 4,824,499 A | 4/1989 | Kagawa |
| 4,865,791 A | 9/1989 | Ferro et al. |
| 4,871,796 A | 10/1989 | Komatsu et al. |
| 4,873,132 A | 10/1989 | Jones et al. |
| 4,891,392 A | 1/1990 | Abe et al. |
| 4,906,683 A | 3/1990 | Komatsu et al. |
| 4,918,127 A | 4/1990 | Adur et al. |
| 4,957,803 A | 9/1990 | Foley |
| 4,957,968 A | 9/1990 | Adur et al. |
| 4,968,464 A | 11/1990 | Kojoh et al. |
| 5,409,779 A | 4/1995 | Puckett et al. |
| 5,560,967 A | 10/1996 | Isaksen |
| 6,045,921 A | 4/2000 | Restaino et al. |

*Primary Examiner*—Donald J. Loney
(74) *Attorney, Agent, or Firm*—Harness, Dickey & Pierce, P.L.C.

(57) ABSTRACT

A composite high density plastic sheet, comprising a thermoplastic elastomer filled in substantial amount with an inorganic material, and intimately blended with a high strength low density polyethylene or elastomeric polymer whereby to provide one product the benefits of sound attenuation as well as inhibiting water and dust entry. The sheet can be cold-formed to include a pocket portion for use in applications such as receiving vehicle apparatus. Provision of a separate layer of the low density polyethylene assists in the sheets being stacked and adhesive permits the sheet to be removably attached to a surface of the apparatus.

11 Claims, 2 Drawing Sheets

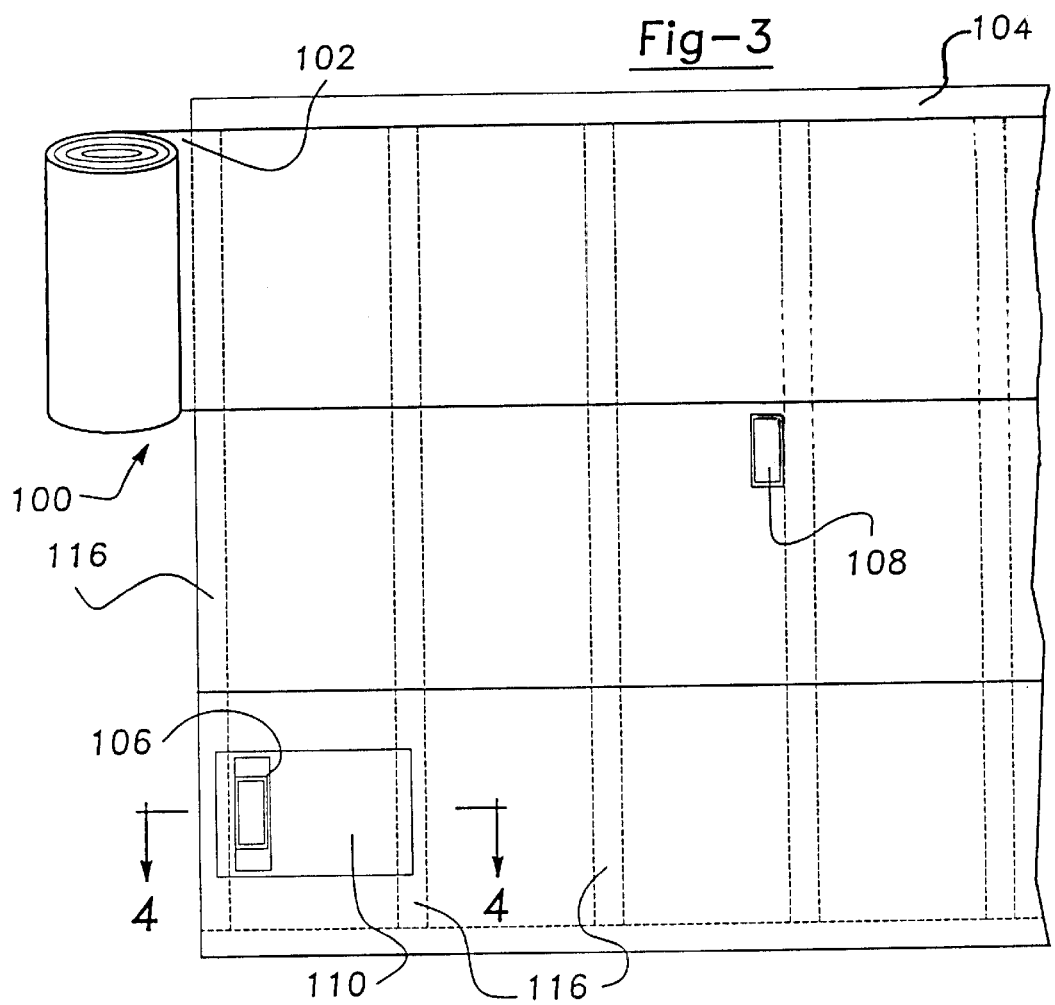
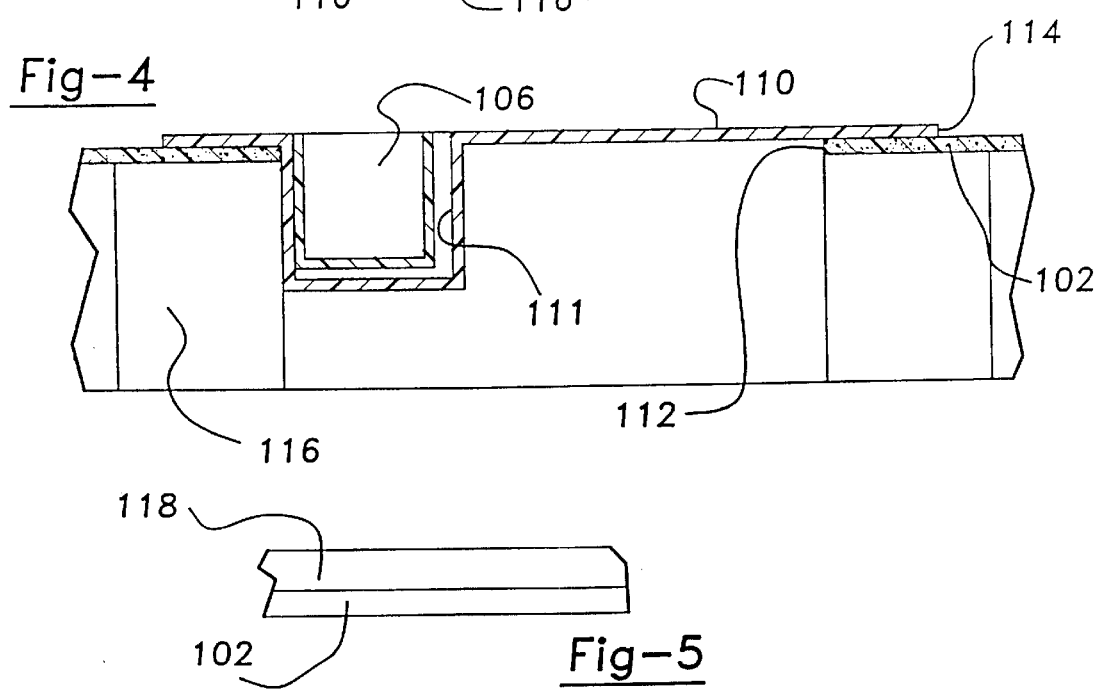

SHIELD FOR WATER AND SOUND

RELATED APPLICATIONS

This is a continuation of U.S. Ser. No. 08/803,985, filed Feb. 21, 1997, now U.S. Pat. No. 6,045,921, which is a continuation-in-part of U.S. Ser. No. 08/391,407, filed Feb. 16, 1995; which is a divisional of U.S. Ser. No. 08/160,375, filed Nov. 30, 1993, now U.S. Pat. No. 5,409,779; which is a continuation of U.S. Ser. No. 07/652,021, filed Feb. 7, 1991, now abandoned.

BACKGROUND OF THE INVENTION

This invention is directed to a composite, high density plastic sheet material used in the manufacture of a water, dust, wind, air and sound barrier and method of making same. The invention is particularly suited for use in the manufacture of automotive vehicle door panels and will be described with reference thereto, however, as will become apparent, the invention is capable of broader application and could equally well be used as a lightweight sound barrier shield or vibration dampener. Another aspect of the present invention is directed to a sound barrier for use in construction of a building.

It is known that surface protectors or deflectors are particularly suited for shielding the inner panels of vehicles against the infiltration of water or dust. In general, the deflectors comprise a thin, flexible sheet of a plastic material having a peripheral shape to overlie a predetermined portion of the inner door sheet metal. Typically, the deflectors are joined to the door sheet metal by pressure sensitive adhesive applied in a band around the peripheral edge of the deflectors.

There has been an ongoing need for the flat deflectors to include bulges or pockets to allow them to adequately accommodate radio speakers, door panel clips and similar devices which extend inwardly or outwardly of the door from the inner panel. Typically, the sheet results from a thermoforming operation. These prior attempts have not been altogether successful, especially when the sheet must be cured, stacked, and provided with the adhesive.

Further, the plastic deflectors have not been altogether satisfactory in preventing noise transmission (e.g., tire noises).

Additionally, while many types of insulation materials are available for home use, there remains a need for a sound deadening material which can be easily applied to building structures for providing sound deadening.

The subject invention provides a structure and method of forming the same which overcome the above-noted problems and others in an economical manner.

SUMMARY OF THE INVENTION

In accordance with the subject invention, a suitable barrier against water, sound, dust and air comprises a mixture of an inorganically filled thermoplastic elastomer intimately blended with a suitable polyethylene, such as those characterized as being a low density polyethylene (LDPE), or a linear low density polyethylene (LLDPE), an ultra-low density polyethylene (ULDPE), or an elastomeric thermoplastic. In accordance with one aspect of this invention, the barrier is either cold formed or hot formed to include a bulge or pocket like area. In accordance with another aspect of this invention, the barrier is formed (e.g., laminated) to include a separate layer of a low surface energy polymer, such as the low density polyethylene, or treated with silicone release coating, whereby the barriers can be stacked for dispensing. In accordance with yet another aspect of the invention, the barrier can form a deflector against sound and water.

In an alternate embodiment the subject invention may be used in a system for sound deadening a room. The barrier is provided in a thicker rotatable form. The system may include attaching this film to either wall structures or to a wallboard or other wall covering material which can be secured to the wall framework.

Advantageously, the barrier can be formed by a single extrusion or co-extrusion processes that are known in the art and thus allowing the user to utilize known forming techniques and apparatus.

A further advantage is provision in one product the sound, water, dust, air, wind, ease of installation, and cost benefits.

A further advantage is provision of a composite sheet which is not only flexible but also somewhat limp, whereby to deaden sound transmission loss in both the low as well as the high frequency ranges. Although the composite sheet is relatively flexible, it is still sufficiently rigid to function as a barrier but the limp nature of the sheet minimizes vibration of its own thereby preventing harmonic vibration such as that caused by speakers.

A further advantage is provision of a barrier of the type described having a plurality of pockets or bulges for use in vehicle door panels wherein the user utilizes the bulges to position the barrier on the door during installation.

A further advantage is providing a construction sound attenuation barrier for use in buildings, and a method for sound deadening a room by using barriers with preformed pockets for deadening around outlets or the like.

Advantageously, the bulge can be cold-formed whereby post curing difficulties are obviated. Desirably so, such as where the bulge is somewhat cone-shaped, the material thickness can be maintained of generally uniform thickness and does not tend to have thinned regions of reduced strength.

The above and other advantages of the invention will become apparent to those skilled in the art upon a reading and understanding of the following description.

BRIEF DESCRIPTION OF THE DRAWINGS

FIG. 3 is a perspective and elevational view partially in phantom showing the sound barrier application structure.

FIG. 4 is a sectional view taken along line 4—4 of FIG. 3.

FIG. 5 is a sectional view showing a wallboard sound barrier laminate.

DETAILED DESCRIPTION OF THE PREFERRED EMBODIMENTS

Turning now to the drawings, a barrier according to the present invention for inhibiting passage of water, sound, air and dirt will be described with respect to its application to a vehicle door and will also be described for applications involving sound barriers in building structures.

Figure 1:
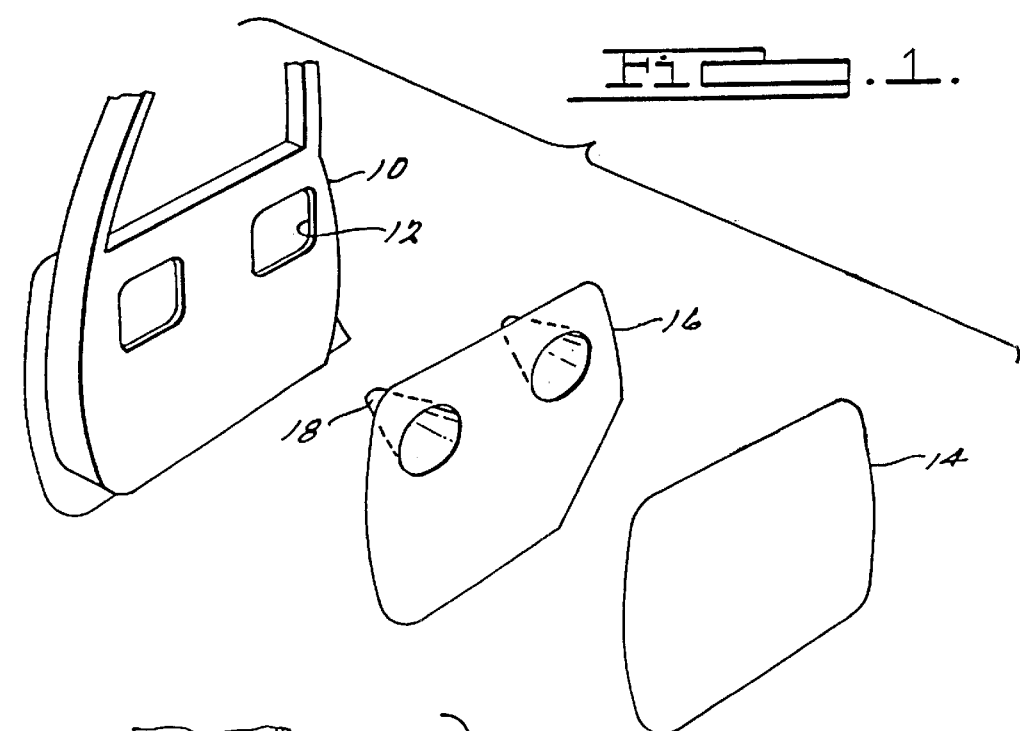
FIG. 1 is a perspective view showing a barrier of the present invention for application to an automotive vehicle door.

In FIG. 1, a vehicle door is comprised of an outer metallic door frame 10 having a plurality of spaced openings 12, an inner trim panel 14 sized to fit onto and be secured to the frame, and a barrier 16 cold-formed to include a plurality of bulges or pockets 18. The arrangement and shape of the frame, panel and barrier would change, according to the vehicle model.

Barrier 16 is illustrated as comprising a generally thin planar sheet comprised of a thermoplastic elastomer filled with a substantial amount of an inert or inorganic material intimately blended with a suitable low density polyethylene (LDPE), including those plastics characterized as being a linear low density polyethylene (LLDPE), an ultra-low density polyethylene (ULDPE), or an elastomeric polymer. The thermoplastic elastomer comprises between 80% to 98% and preferably about 95% and the polyethylene comprises between 2% to 20% and preferably about 5%, by weight. The thickness of the sheet is minimized and the flexibility maximized by the inorganic filler content comprising at least 50% to about 85% of the thermoplastic elastomer, by weight, and preferably 80%, and the inorganic filler consisting essentially of calcium carbonate and barium sulfate. Sound deadening benefits are achieved by the above-subject thermoplastic elastomer. The water, wind, air and dust benefits are achieved through the ability of the low density polyethylene to impart flexibility, high tear strength and stretch characteristics to the sheet. A decrease in tear strength of the barrier results when the polyethylene approaches the lower end of its range. One suitable thermoplastic elastomer is Keldex® 6868, a trademark of DuPont, and one suitable low density polyethylene is Attane®, a trademark of Dow Chemical Company. Other polyethylenes which are suitable include olefin plastomers such as Affinity®, available from Dow Chemical Company, Midland, Mich.; and EXPOL® plastomers, available from Exxon, Houston, Tex., which have a density range of 0.870 to 0.930 gm/cc. A suitable example is Affinity® PF 1140 olefin plastomer, available from Dow Chemical Company.

While those skilled in the art will recognize that the sheet could have different thicknesses, for the intended purposes, it has been found that a thickness in the range of approximately 15–35 mils is preferable. Sound attenuation is directly proportional to the basis of the weight of the sheet. Generally, a weight basis of from about 0.15 to 0.75 lb./sq. ft. is used. A preferred weight basis is in the range of 0.15 to 0.30 lb./sq. ft. Lighter weight basis sheets are suitable for some uses but for proportionally lower sound attenuation.

In accordance with this invention, a layer 20 of the low density polyethylene (e.g., Attane®) can be formed on one surface or both surfaces of the sheet. Many methods are possible, such as lamination, co-extrusion or extrusion coating. These methods would be known to those skilled in the art.

In one embodiment, the composite barrier 16 was about 20 mils thick, and the layer 20 was about 2 mils, making the total sheet thickness about 22 mils. The cone 18 was about 2 inches in diameter and height. The density of the thermoplastic elastomer was about 2.07 gm/cubic centimeters. The density of the polyethylene was in the range of about 0.870 to 0.930 gm/cubic centimeters, and preferably about 0.901 gm/cubic centimeters.

Figure 2A:
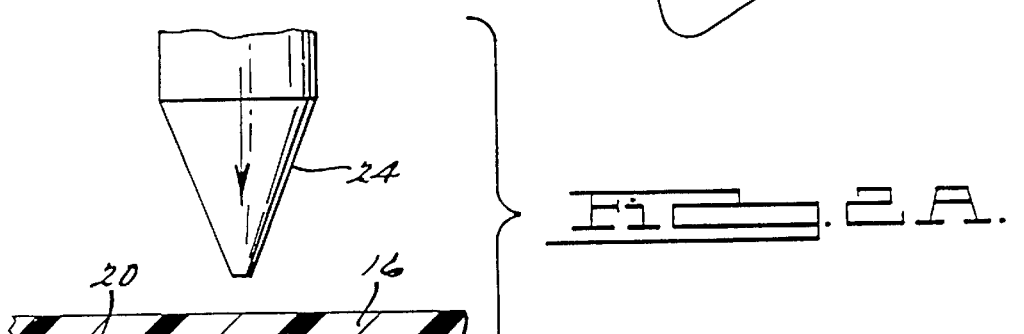
FIGS. 2(*a*) and 2(*b*) are cross-section views showing the cold-forming of a pocket in the barrier of FIG. 1.
Figure 2B:
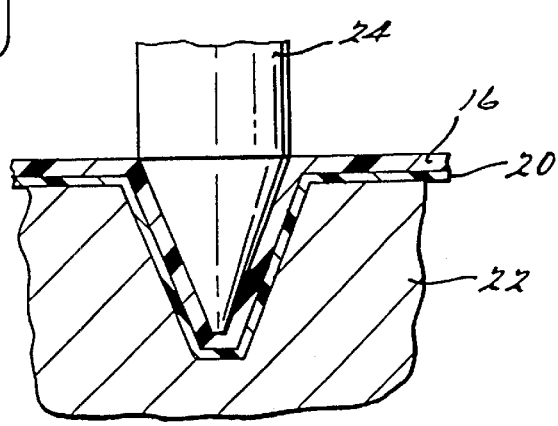

Referring now to FIGS. 2(a) and 2(b), the pockets or forms are shown being formed by a cold-forming drawing operation although other conventional techniques could be utilized, such as vacuum forming. FIG. 1 shows the general configuration of a preferred pocket 18 as being cone-shaped. In the drawing operation, cooperating interengaging die members 22 and 24 are moved together with the composite sheet comprising barrier 16 and layer 18 positioned therebetween. The die members are then moved toward one another to produce localized stretching and permanent deformation of the sheet. The pocket 18 can advantageously be formed in the sheet while the sheet is at or near room temperature and without the use of thermoforming equipment. The process allows conventional presses to be used for both pocket forming and sheet cutting. The choice of materials allows the pocket to form without memory and tearing, due to the high tear and elongation properties of the composition materials. The pocket is collapsible to lie essentially in the plane of the sheet and extendable in a direction away from the sheet.

Additionally, if desired, a plurality of barriers 16 can be die cut and stacked without the use of a carrier or a release sheet. In this regard, relative ease of release between parts can be achieved through the use of a silicone release coating, or the co-extrusion of a low surface energy polymer on one side. A preferred silicone release coating is General Electric UV 9300, a 100% solid, ultraviolet cure coating, at a surface deposition of less than 1 gm/sq. m. A preferred low energy polymer is the above-mentioned Attane® or Affinity®, applied at a surface layer thickness of 1 to 3 mils, using standard lamination, co-extrusion or extrusion techniques.

In operation, the highly filled thermoplastic elastomer (e.g., Keldex®) and low density polyethylene (e.g., Attane®) or elastomeric polymer are mixed together in an extruder, intimately blended, formed into a sheet, and wound on a roll. If desired, the layer 20 of polyethylene could be formed simultaneously. This sheet material is then calendared to smooth out roughness. If desired, the sheet could be unwound, whereby to receive the silicone layer, and a desired adhesive pattern, and then cured. The cone can be formed by passing the sheet between the interengaging dies. Thereupon the cone-formed sheet could be rewound and sent to a die cutting machine. There the sheets would be cut, stacked, and die cut into a desired configuration, such as barrier 16. It should be understood that some steps could be substantially simultaneous, such as die cutting and cone forming and die cutting and sheet forming. The sheet could be formed to include a plurality of pockets, depending on the vehicle door. The pockets assist the user in assembly by supporting the sheet on the door.

Additionally, the single sheet without pockets could be used to advantage in non-automotive applications. The inorganically filled thermoplastic elastomer adds needed mass, which assists in deadening sound. While the sound attenuation (i.e., sound transmission loss) improves at the higher frequencies (i.e., short wavelengths), benefits are gained at the low frequencies (i.e., long wavelengths), such as outside noise.

The composition of barrier 16 provides a limp elastic structure, as opposed to a thin sheet of a single plastic material, that assists in deadening sound. As such, the barrier can be applied to a metal plate as a vibration dampener or used as a sound barrier.

Referring now to FIG. 3, there is shown a sound deadening system which is shown at 100. The system 100 includes a sound deadening material 102 which may be applied to a wall structure 104. Wall structures such as shown at 104 include 2×4 or other framework and may include outlet boxes such as shown at 106 or switch boxes such as shown 108.

The deadening material 102 is of the same composition generally as the automotive barrier shield. However, the preferred embodiment for the sound barrier in the present invention is a blended mixture of thermoplastic elastomer and polyethylene in the ranges set forth above. The product primarily differs in that for sound deadening in buildings the material is somewhat thicker than the automotive applications. The thickness of the material may range generally from about 35 thousandths of an inch up to 1 inch. Preferably, the material of the present invention has a thickness of from about 50 to 75 thousandths of an inch which allows the material to be rolled into rolls as shown in FIG. 3 to provide an easy method of application of the material to the structure 104. Preferably, the materials of the present invention have a sound transmission factor (STF) of above 50. The material may be provided in rolls which are 48 inches wide such that they may be applied over standard wall sizes in a horizontal direction.

In the system of the present invention, a preconfigured cut-out member 110 having a surrounding indentation 111 is provided for application around wall inserts such as outlet boxes or the like which require insulation from sound to provide a more secure sound deadening arrangement. Thus, as shown in FIG. 4, a hole 112 may be cut in the material 102 and the insert member 110 would be placed within the hole and adhered by an adhesive layer 114 or may be stapled to the studs 116 above. Thereafter, a suitable hole may be drilled through wire insertion and the box 106 may be applied to the stud as is known in the art.

In an alternate embodiment as shown in FIG. 5, the material of the present invention 102 may be laminated to a wallboard 118 or other insulating material. This provides a sound deadening material for backing up the wallboard or the like thereby providing a very effective sound barrier for construction building applications. Thus, the laminate panels could be produced by laminating material to 4'×8' sheets of wallboard. Thereafter the 4'×8' sheets could be placed on standard 16" center 2×4 wall frames as are known in residential construction. Sound barriers of the present invention are effective since they are highly filled and create sound deadening above and beyond most standards.

The product can be used as a single layer, or also as a laminate with the outer layer as disclosed previously. The sound barrier may be laminated on one side or both sides with a polyethylene, as may be desired. Advantages of lamination, on either one or both sides, are improved moisture resistance, improved barrier properties, and the polyethylene layer allows adhesion as well as mechanical fastening for placement of the barrier in structures or the like. Thus, depending on the final desired properties, the sheet may have films on one side, or both sides, to provide the proper barrier properties.

While the above description constitutes the preferred embodiment(s) of the invention, it. will be appreciated that the invention is susceptible to modification, variation, and change without departing from the proper scope or fair meaning of the accompanying claims.

What is claimed is:

1. A barrier device consisting essentially of a mixture of polyethylene or elastomeric polymer intimately blended with a thermoplastic elastomer substantially filled with an inorganic filler, wherein said barrier device is substantially impervious to water and air and has enhanced sound deadening properties, wherein said barrier device comprises a substantially thin continuous planar sheet having first and second surfaces and an edge of desired configuration, and a substantially thin continuous planar layer of low density polyethylene being formed on one of said surfaces.

2. The invention as recited in claim 1, wherein said thermoplastic elastomer comprises from about 80% to about 98% and said polyethylene comprises from about 2% to 20%, by weight.

3. The invention as recited in claim 1, wherein the thermoplastic elastomer is about 95% and the polyethylene is about 5%, by weight.

4. The invention as recited in claim 1, wherein the elastomer has a weight basis in the range of 0.15 to 0.75 lb./sq. ft.

5. The invention as recited in claim 1 wherein the inorganic filler comprises between about 50% to about 85% of the thermplastic elastomer.

6. The invention as recited in claim 1 wherein the inorganic filler comprises at least about 50% of the thermoplastic elastomer.

7. The invention as recited in claim 1, wherein the inorganic filler comprises approximately about 80% of the thermoplastic elastomer.

8. The invention as recited in claim 1 wherein the inorganic filler consists essentially of calcium carbonate and barium sulfate, which have densities in the range of from about 1.0 to about 5.0 lbs./cu. ft.

9. The invention as recited in claim 1, further comprising a low energy polymer co-extruded on one of said surfaces.

10. The invention as recited in claim 1, further comprising a release agent bonded on one of said surfaces.

11. The invention as recited in claim 1, wherein said thin planar sheet further comprises at least one pocket being formed therein, said pocket being collapsible to lie essentially in the plane of the sheet and extendible in a direction away from one surface of said barrier.

* * * * *